W. H. SAYRE.
BRAKE SHOE.
APPLICATION FILED FEB. 24, 1913.
1,167,937.
Patented Jan. 11, 1916.
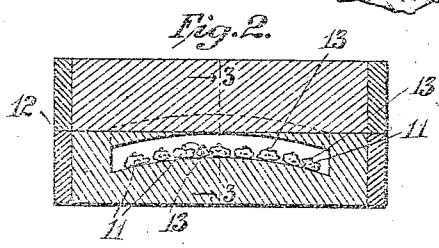
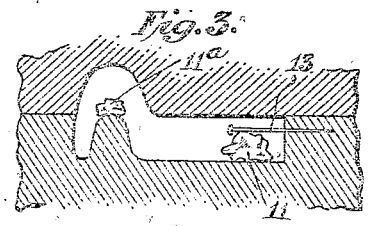
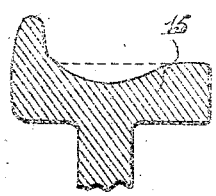
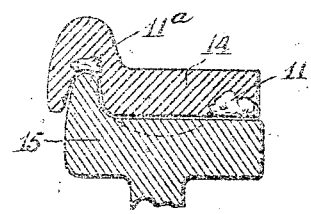
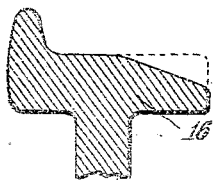
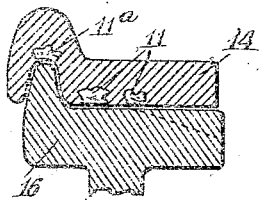
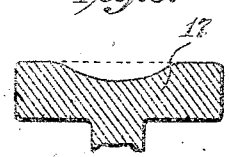
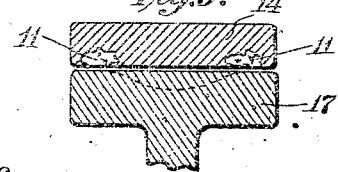
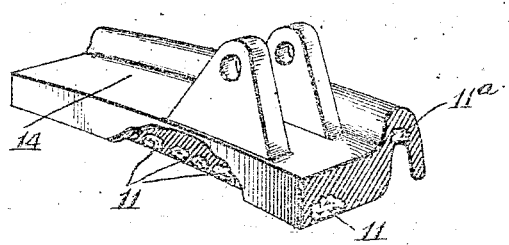
Attest:
Inventor: William H. Sayre
by Wm. J. Dolan, Atty

UNITED STATES PATENT OFFICE.

WILLIAM H. SAYRE, OF GLEN RIDGE, NEW JERSEY, ASSIGNOR TO AMERICAN ABRASIVE METALS COMPANY, OF NEW YORK, N. Y., A CORPORATION OF NEW YORK.

BRAKE-SHOE.

1,167,937.  Specification of Letters Patent.  Patented Jan. 11, 1916.

Application filed February 24, 1913. Serial No. 750,154.

*To all whom it may concern:*

Be it known that I, WILLIAM H. SAYRE, a citizen of the United States, residing at Glen Ridge, in the county of Essex, State of New Jersey, have invented certain new and useful Improvements in Brake-Shoes, of which the following is a specification.

My invention relates to brake shoes such, for example, as are used for car wheels.

It is an object hereof to provide a superior brake shoe which is capable of keeping true the periphery, for example, the tread and flange of the ordinary car wheel or wheel tire running upon a rail.

A particular object hereof is to afford such a brake shoe which may be cheaply, economically and well made, and by a simple method as hereinafter described.

Another object is to avoid the need of adjustments, attachments and loose parts, and yet provide a brake shoe entirely effective and satisfactory for the purposes set forth.

Other objects of the present invention will be set forth in the hereinafter following description or will be apparent to those skilled in the art.

To the attainment of such objects, the present invention consists in the novel brake shoe hereinafter described and illustrated.

In the herein illustrated particular embodiment of the present invention, the brake shoe provided thereby is distinguished from brake shoes in which the body is first produced with recesses and in which subsequently masses of finely divided abrasive pieces are prepared and adjusted to those recesses and attached therein; and the present improvement is also distinguished from brake shoes in which, as an abrasive material, is employed a substance such as granite, flint or emery which would not be adapted to the present invention for reasons that will hereinafter appear; and is also distinguished from the brake shoes merely having portions of the body metal thereof chilled or hardened at selected surface portions. In one sense, the present improvement may be said to be a cast metal brake shoe consisting of the shoe body composed of the cast metal, having embedded or incorporated therein during the casting process and as a permanent part of the shoe one or more inserts composed of lumps of a hard mineral abrasive material of a nature proof against impairment by the casting temperature, such abrasive material located at active exposed portions of the shoe and in position to properly abrade and keep true the car wheel. Flint, emery, granite and the like, would not afford a practicable brake shoe for the reason that the conditions or temperature of casting or actual service would materially impair or destroy their availability for the purpose hereof by rendering them friable.

I will first describe a brake shoe embodying my invention and the method of manufacturing the same, and will thereafter point out the novel features in the claims.

In the accompanying drawings: Figure 1 shows lumps of crystallized alundum, a material which is procurable in the market; these may, for example, be one and one-half inches in diameter in order to constitute inserts for the purposes of this invention. Figs. 2 and 3 indicate cross-sections of a mold in which detached lumps of alundum are secured at intervals prior to the pouring of the casting metal into the mold. Figs. 4, 5 and 6, in cross-section, indicate three different ways in which car wheels may become worn and require truing up. Figs. 7, 8 and 9, in cross-section, indicate brake shoes for truing up or correcting the uneven wear of the car wheels, as illustrated in Figs. 4, 5 and 6, respectively. Fig. 10 is a perspective view of what may be considered a typical embodiment hereof and to which Figs. 2, 3, 4 and 7 also refer.

Similar reference characters will be employed in the several figures to designate corresponding parts.

Referring first to the method of producing a brake shoe in accordance with the present invention, this being a cast metal brake shoe, I commence with the preparation of the mold, after which I secure in the mold at or near what are to be the active surfaces of the brake shoe, a quantity of mineral abrasive material which is of greater hardness than the casting metal and is proof against impairment by the casting temperature. This mineral abrasive material will preferably consist of lumps of alundum 11, which are shown in Figs. 2 and 3, secured within the mold 12 by any desired securing means 13. The securing means may consist of a wire nail, and in this way the lump of abrasive mineral is prevented from displacement during casting. Frequently it is sufficient merely to press the pieces slightly into the sand, sufficiently to prevent their floating when the metal is poured. In manufacturing the form of brake shoe shown in Fig. 10, abrasive material should be located not only opposite the wheel tread but also opposite the wheel flange, as clearly indicated in Figs. 2, 7 and 8, at 11ª.

Preferably instead of having a single insert of great area or length, I employ a series of detached inserts, as clearly indicated in Figs. 2 and 10, and their size may be decreased and number increased indefinitely, as desired except that the lumps should not be reduced below a size which enables them to be securely held in the body of the casting so that, at the same time, a considerable portion of their surfaces may form parts of the active face of the brake shoe, and also that the number and size of the lumps should be such that their exposed surfaces will form only a minor part, usually about ten per cent. of the active face of the brake shoe. The necessity for making the lumps of appreciable size arises from the necessity of having a considerable body anchored in the casting so that the lump cannot be dragged out of its matrix by the friction of the wheel. This firm anchoring of the lumps is further secured by their naturally highly irregular shape, as shown in the drawings. When a large number of fine particles are used in the shape of a comminuted mass of the hard material these small particles rest on the surface of the casting and are easily rubbed off by the wheel. This robs the shoe of all the hard material so swept away and destroys the cutting action of the shoe on the wheel to that extent. Furthermore, the particles so torn away from the shoe during a severe application of the brakes which heats the wheel, are apt to embed themselves in the temporarily heat softened tread of the wheel and so transferred become so many cutting tools for rapidly cutting up the shoe instead of doing the intended work of cutting the wheel. The necessity for maintaining the number of lumps used at such a low figure that the sum of the exposed surfaces of the lumps will form only a minor portion of the active surface of the shoe arises from the fact that said shoe is still primarily a friction producing device, and only secondarily a cutting tool. The primary purpose of each shoe application is to stop the wheel from turning. Incidentally and secondarily, the purpose is to cut away a minor portion of the wheel face which is not sufficiently worn down by the rail. To produce the friction the major active portion of the shoe face must still be cast iron, or cast steel as distinguished from those surfaces heretofore solely designed for cutting, polishing, abrading, or resisting wear, which are wholly composed of hard material.

The mold and the inserts being thus prepared, the molten casting metal which will ordinarily be one of the ferrous metals such as cast iron, will be poured into the mold, the casting metal thus embedding the abrasive lumps and causing them to become consolidated in the body or matrix 14, thus becoming a permanent part of the brake shoe. Owing to the greater hardness of the abrasive material as compared with the cast iron, it is able to perform its function of truing the car wheel as required. Owing to its being of a nature proof against impairment by the high casting temperature, as well as by the temperature and hard usage of actual service, the abrasive lumps are uninjured and are able to effectively serve their function.

Generally speaking, it may be said that the abrasive material may be located in the shoe at any desired point suitable to the particular circumstances. For example, under ordinary circumstances a car wheel 15 will wear at its tread near its flange, as indicated in Fig. 4, forming a groove in the tread and thus creating a false flange beyond the groove. For such a car wheel a brake shoe should be provided according to the present improvement, having the abrasive material located at 11, as shown in Figs. 7 and 10. By this arrangement, whenever the brake shoe is applied for braking the car wheel, the wear upon the wheel is at that point where the protuberance tends to form, so that the tread of the wheel is kept approximately cylindrical, and the growth of the protuberance is prevented. In such cases as this where the wheel has the ordinary flange, a second portion of abrasive material is desirable in order to grind down the wheel flange thus preventing the flange from extending excessively beyond the wheel tread as the wheel wears. Such additional abrasive material is shown at 11ª. Obviously for different conditions the location of the abrasive material can be altered. Thus, sometimes it is found that with particular conditions the wheel 16 will wear as indicated in Fig. 5, and in that case the brake shoe should be provided with abrasive material as shown in Fig. 8. In the case of locomotives with three or more driving wheels, sometimes the middle wheel 17 is unflanged and the wear in such case may be as in Fig. 6. To meet this situation, a brake shoe, as in Fig. 9, may be employed. In any case, the action is that as long as there is any false flange upon the wheel tread the tendency toward its formation is offset by the wear produced by the abrasive alundum pieces 11. At the same time, the presence of the alundum in the brake shoe increases the braking action thereof and renders the shoe more efficient.

It will be noticed that with the use of this invention, the wear upon the wheel is not increased but it is merely adjusted to keep the wheel free from false flanges, for as soon as the false flange opposite the abrasive material is reduced the abrading action substantially ceases and the wear is then only what it would be with an ordinary cast iron brake shoe.

In referring specifically to alundum as a preferable abrasive material, I do not wish to be limited thereto and I refer to that as representative of other materials such as aloxite, and in some cases carborundum which might be available. At the same time I exclude materials such as granite, flint or emery which do not comply with the hereinafter following claims because they contain a certain amount of water of crystallization which evaporates under the heat of the surrounding molten metal in which they are submerged in casting, leaving them friable. Also these materials or the compounds which must be formed therewith to physically hold masses of small particles thereof in pockets in the brake shoe, are subject to destructive action from the acids occurring in weak aqueous solution in the water of many coal mines. Alundum and other hard materials most useful with my invention are unaffected by such acid reactions.

The brake shoe hereinabove described possesses not only the advantages stated, but also the important advantage that it is enabled to effectively withstand any heat that is likely to be produced in service. Further, it is highly capable of withstanding the wear and tear occasioned in service without danger of breakage. By the use of this invention, a brake shoe is afforded which has a considerably longer life than the ordinary cast iron brake shoe or any heretofore known wheel-truing brake shoe that I am acquainted with. Expense of maintenance is thus saved. No grinding down of the car wheels or tires is required, which would be a big item of expense particularly in special situations such as coal mines where sand and gritty material is liable to constantly come between the rail and wheel. There will be a minimum need of replacement of brake shoes. For all these reasons I believe the brake shoe of the present invention is superior to any heretofore known.

While I have described one specific embodiment of a brake shoe and method of making the same, I do not wish to be limited to the details described as the same may be indefinitely varied within the principles of the present improvement.

What I claim and desire to procure by Letters Patent is:

1. A self trimming brake shoe composed of a cast metal body having embedded therein lumps of harder material of considerable size and irregular shape, said lumps being arranged so as to form a minor part of the wearing surface of the shoe, and so as to come opposite only the particular portion or portions of the wheel which are to be trimmed.

2. A self trimming brake shoe composed of a cast metal body having embedded therein lumps of alundum of considerable size and irregular shape, said lumps being arranged so as to form a minor part of the wearing surface of the shoe, and so as to come opposite only the particular portion or portions of the wheel which are to be trimmed.

3. A brake shoe adapted to true the wheel braked thereby, the same composed of a cast-metal body of suitable shape, having embedded therein a plurality of detached lumps of irregular shape and considerable size of a mineral abrasive, which is of considerably greater hardness than the body-metal and is proof against impairment at the casting temperature of the body metal, and said irregular lumps being arranged so as to form a minor part of the wearing surface of the shoe, and so as to afford an abrading effect chiefly at the particular wheel portions which are least subject to wear.

4. A brake shoe adapted to true the wheel braked thereby, the same composed of a cast-metal body of suitable shape, adapted to contact entirely across the tread of a wheel, and having embedded therein a plurality of detached pieces of considerable size of a mineral abrasive, which is of considerably greater hardness than the body-metal and is proof against impairment at the casting temperature of the body-metal, and said pieces being arranged so as to form a minor part of the wearing surface of the shoe, and so as to afford an abrading effect chiefly at the particular wheel portions which are least subject to wear.

In testimony whereof, I have signed my name to this specification, in the presence of two subscribing witnesses.

WILLIAM H. SAYRE.

Witnesses:
RALPH P. SPOONER,
HAROLD W. MOWERY.